United States Patent
Sheynman et al.

(10) Patent No.: US 10,616,300 B2
(45) Date of Patent: *Apr. 7, 2020

(54) MOBILE MEDIA CONTENT DELIVERY

(71) Applicant: BlackBerry Limited, Waterloo (CA)

(72) Inventors: Arnold Sheynman, Northbrook, IL (US); Mark Pecen, Waterloo (CA); Marcel Villaflor, Katonah, NY (US); Dake He, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/590,806

(22) Filed: May 9, 2017

(65) Prior Publication Data
US 2017/0244773 A1 Aug. 24, 2017

Related U.S. Application Data

(63) Continuation of application No. 13/767,137, filed on Feb. 14, 2013, now Pat. No. 9,680,896, which is a (Continued)

(51) Int. Cl.
H04L 29/08 (2006.01)
H04L 29/06 (2006.01)
H04W 4/18 (2009.01)

(52) U.S. Cl.
CPC ........ H04L 65/602 (2013.01); H04L 65/4084 (2013.01); H04L 67/18 (2013.01); H04W 4/18 (2013.01)

(58) Field of Classification Search
CPC ... H04L 65/602; H04L 67/18; H04L 65/4084; H04W 4/18
See application file for complete search history.

(56) References Cited

U.S. PATENT DOCUMENTS 6,407,680 B1* 6/2002 Lai ............... H04N 7/17318
341/50
6,925,504 B1 8/2005 Liskov et al.
(Continued)

FOREIGN PATENT DOCUMENTS

CN 1511405 A 7/2004
CN 1972439 A 5/2007
(Continued)

OTHER PUBLICATIONS

Chinese Office Action; Application No. 201180069273.6; dated Dec. 4, 2017; 19 pages.
(Continued)

Primary Examiner — Aftab N. Khan
(74) Attorney, Agent, or Firm — Conley Rose, P.C.; J. Robert Brown, Jr.; Robert E. Kent

(57) ABSTRACT

A system and method are disclosed for managing the wireless delivery of streaming media content to a user equipment (UE) device. A UE device establishes a network connection with a local wireless network, which in turn is associated with a wireless network region with a corresponding data infrastructure server. The UE device then requests predetermined streaming media content from the data infrastructure server. A determination is made whether the requested streaming media content is stored in transcoded form on the data infrastructure server. If so, then a control information network is implemented to transmit and receive streaming media content control data between the UE device and the data infrastructure server. In turn, the streaming media content control data is used by the data infrastructure server to control the transmission of the transcoded streaming media content over a data network for delivery to the UE device.

18 Claims, 9 Drawing Sheets

Related U.S. Application Data continuation of application No. PCT/US2011/021322, filed on Jan. 14, 2011.

(56) References Cited

U.S. PATENT DOCUMENTS

| | | | |
|---|---|---|---|
| 6,981,045 B1* | 12/2005 | Brooks | H04L 29/06027 348/E7.073 |
| 8,423,606 B1 | 4/2013 | Streeter et al. | |
| 9,680,896 B2 | 6/2017 | Sheynman et al. | |
| 2003/0018796 A1* | 1/2003 | Chou | H04L 29/06 709/231 |
| 2003/0079027 A1 | 4/2003 | Slocombe et al. | |
| 2003/0158913 A1* | 8/2003 | Agnoli | H04L 29/06 709/219 |
| 2005/0025064 A1 | 2/2005 | Chang et al. | |
| 2006/0291489 A1 | 12/2006 | Naqvi et al. | |
| 2009/0300137 A1 | 12/2009 | Tyhurst et al. | |
| 2010/0043017 A1 | 2/2010 | Paul et al. | |
| 2010/0114857 A1 | 5/2010 | Edwards et al. | |
| 2010/0211968 A1 | 8/2010 | Itskov et al. | |
| 2010/0287585 A1 | 11/2010 | Frondal et al. | |
| 2010/0332565 A1* | 12/2010 | Al-Shaykh | H04N 7/163 707/912 |
| 2011/0225417 A1 | 9/2011 | Maharajh et al. | |
| 2011/0252160 A1 | 10/2011 | Wu | |
| 2013/0166580 A1* | 6/2013 | Maharajh | H04L 65/605 707/758 |

FOREIGN PATENT DOCUMENTS

| | | |
|---|---|---|
| WO | 2008070832 A2 | 6/2008 |
| WO | 2010134984 A1 | 11/2010 |

OTHER PUBLICATIONS

European Examination Report; Application No. 11703061.9; dated Feb. 12, 2018; 3 pages.

Chinese Office Action as Received in Co-pending Application No. 201180069273.6 dated Jul. 4, 2017; 11 pages. (No English translation available).

Palau, Carlos Enrique, et al.; "Wireless CDN Video Streaming Architecture for IPTV"; Multimedia Tools and Applications; Apr. 1, 2010; 23 pages.

Wee, Susie, et al.; "Research and Design of a Mobile Streaming Media Content Delivery Network"; IEEE; 2003; 4 pages.

Moreno, B. Molina, et al.; "On Content Delivery Network Implementation"; Computer Communications; Mar. 10, 2006; 17 pages.

Office Action dated Jan. 2, 2015; U.S. Appl. No. 13/767,137, filed Feb. 14, 2013; 26 pages.

Final Office Action dated May 27, 2015; U.S. Appl. No. 13/767,137, filed Feb. 14, 2013; 29 pages.

Advisory Action dated Jul. 24, 2015; U.S. Appl. No. 13/767,137, filed Feb. 14, 2013; 3 pages.

Office Action dated Sep. 21, 2015; U.S. Appl. No. 13/767,137, filed Feb. 14, 2013; 24 pages.

Final Office Action dated Feb. 24, 2016; U.S. Appl. No. 13/767,137, filed Feb. 14, 2013; 22 pages.

Advisory Action dated Jun. 1, 2016; U.S. Appl. No. 13/767,137, filed Feb. 14, 2013; 7 pages.

Office Action dated Jun. 24, 2016; U.S. Appl. No. 13/767,137, filed Feb. 14, 2013; 24 pages.

Final Office Action dated Oct. 17, 2016; U.S. Appl. No. 13/767,137, filed Feb. 14, 2013; 28 pages.

Final Office Action dated Nov. 23, 2016; U.S. Appl. No. 13/767,137, filed Feb. 14, 2013; 36 pages.

Advisory Action dated Feb. 13, 2017; U.S. Appl. No. 13/767,137, filed Feb. 14, 2013; 8 pages.

Notice of Allowance dated Mar. 28, 2017; U.S. Appl. No. 13/767,137, filed Feb. 14, 2013; 7 pages.

PCT International Search Report; Application No. PCT/US2011/021322; dated Oct. 21, 2011; 4 pages.

PCT Written Opinion of the International Searching Authority; Application No. PCT/US2011/021322; dated Oct. 21, 2011; 6 pages.

Canadian Office Action; Application No. 2,824,707; dated Feb. 11, 2015; 5 pages.

Canadian Office Action; Application No. 2,824,707; dated Jan. 29, 2016; 5 pages.

Chinese Office Action; Application No. 201180069273.6; dated Apr. 30, 2015; 28 pages.

Chinese Office Action; Application No. 201180069273.6; dated Dec. 22, 2015; 31 pages.

Chinese Office Action; Application No. 201180069273.6; dated Apr. 26, 2016; 26 pages.

Chinese Office Action as Received in Co-pending Application No. 201180069273.6 dated Oct. 11, 2016; 11 pages. (No English translation available).

Chinese Office Action as Received in Co-pending Application No. 201180069273.6 dated May 4, 2018; 21 pages. (No English translation available).

\* cited by examiner

MOBILE MEDIA CONTENT DELIVERY

CROSS-REFERENCE TO RELATED APPLICATIONS

This application is a continuation of U.S. patent application Ser. No. 13/767,137 filed Feb. 14, 2013 by Arnold Sheynman, et al. entitled, "Mobile Media Content Delivery" which is a continuation application of International Application No. PCT/US2011/021322 filed Jan. 14, 2011 by Research In Motion Limited entitled, "Mobile Media Content Delivery", all of which are incorporated by reference herein as if reproduced in their entirety.

BACKGROUND

The present invention is directed in general to communications systems and methods for operating same. In one aspect, the present invention relates to systems, methods, and devices for managing the delivery of streaming media content to a user equipment (UE) device.

When compared to fixed wireline or fiber-based networks, wireless networks support substantially less data carrying capacity due to the trade-off of providing the convenience of mobile connectivity. However, smartphone users have exhibited an increasing trend toward viewing streaming media on their devices in recent years. Furthermore, media content sharing (e.g., YouTube) over the Internet has been growing in popularity in North America and Europe, with exponential growth observed between the years 2005 and 2010.

Currently, media traffic is carried by cellular network operators on their user data plane. Due to the relatively large amount of data required to deliver streaming media services, a substantial amount of wireless capacity is utilized. As a result, a wireless operator's ability to service their users in a given area may be adversely affected. For example, users may experience substantially reduced data transmission rates, erratic voice reception, or loss of wireless service altogether.

Various factors affect the delivery of media content to mobile smart phones, including wireless network capacity, mobile device screen size and multimedia capabilities, media formats supported by the mobile device, its processing power, and its corresponding battery life. Accordingly, a need exists for an authentication method, system and device to overcome the problems in the art, such as outlined above. Further limitations and disadvantages of conventional processes and technologies will become apparent to one of skill in the art after reviewing the remainder of the present application with reference to the drawings and detailed description which follows.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
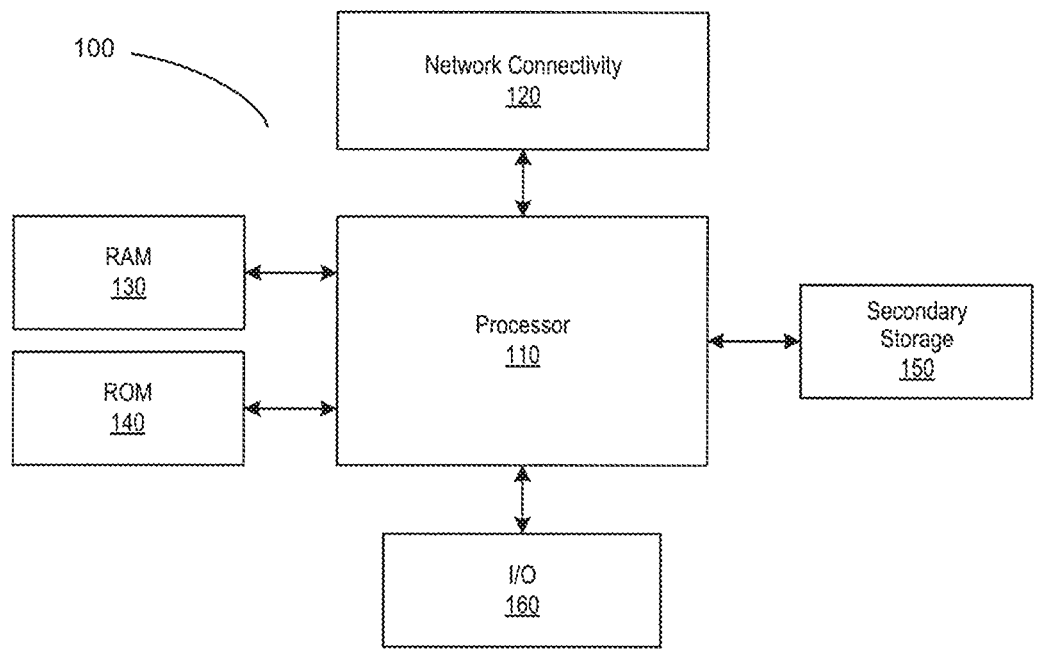
FIG. 1 depicts an exemplary system in which the present invention may be implemented.

A method and system are disclosed for managing the wireless delivery of streaming media content to a user equipment (UE) device. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As used herein, the terms "user equipment" and "UE" can refer to wireless devices such as mobile telephones, smart phones, personal digital assistants (PDAs), handheld or laptop computers, and similar devices or other user equipment that has telecommunications capabilities. In some embodiments, the term "UE" may refer to a mobile, wireless device. The term "UE" may also refer to devices that have similar capabilities but that are not generally transportable, such as desktop computers, set-top boxes, or network nodes.

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity devices 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity devices 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity devices 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks, including Personal Area Networks (PAN) such as Bluetooth. These network connectivity devices 120 may enable the processor 110 to communicate with the Internet or one or more telecommunications networks or other networks from which the processor 110 might receive information or to which the processor 110 might output information.

The network connectivity devices 120 may also be capable of transmitting or receiving data wirelessly in the form of electromagnetic waves, such as radio frequency signals or microwave frequency signals. Information transmitted or received by the network connectivity devices 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may be used to store instructions and perhaps data that are read during execution of the instructions. Access to both RAM 130 and ROM 140 is typically faster than to secondary storage 150. The secondary storage 150 is typically comprised of one or more disk drives or tape drives and may be used for non-volatile storage of data or as an over-flow data storage device if RAM 130 is not large enough to hold all working data. Secondary storage 150 may be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
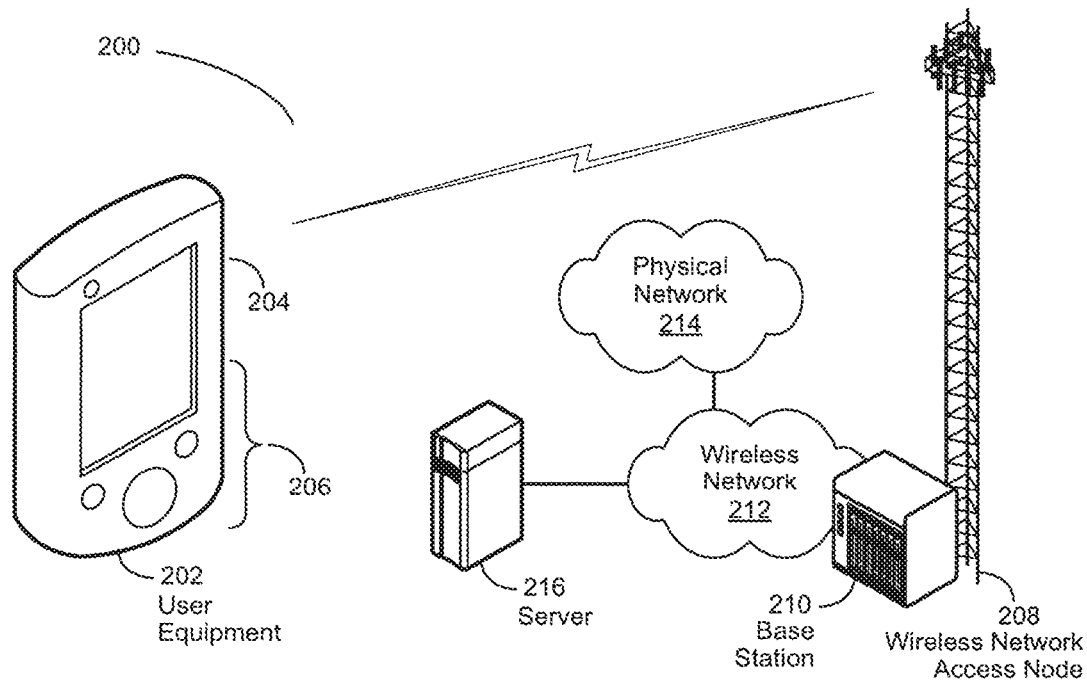
FIG. 2 shows a wireless communications system including an embodiment of a user equipment (UE) device.

FIG. 2 shows a wireless communications system including an embodiment of a user equipment (UE) device. Though illustrated as a mobile phone, the UE device 202 may take various forms including a wireless handset, a pager, a personal digital assistant (PDA), a portable computer, a tablet computer, or a laptop computer. Many suitable devices combine some or all of these functions. In some embodiments, the UE device 202 is not a general purpose computing device like a portable, laptop or tablet computer, but rather is a special-purpose communications device such as a mobile phone, a wireless handset, a pager, a PDA, or a telecommunications device installed in a vehicle. The UE device 202 may likewise be a device, include a device, or be included in a device that has similar capabilities but that is not transportable, such as a desktop computer, a set-top box, or a network node. In these and other embodiments, the UE device 202 may support specialized activities such as gaming, inventory control, job control, and/or task management functions, and so on.

In various embodiments, the UE device 202 includes a display 204. In these and other embodiments, the UE device 202 may likewise include a touch-sensitive surface, a keyboard or other input keys 206 generally used for input by a user. The keyboard 206 may likewise be a full or reduced alphanumeric keyboard such as QWERTY, Dvorak, AZERTY, and sequential keyboard types, or a traditional numeric keypad with alphabet letters associated with a telephone keypad. The input keys may likewise include a trackwheel, an exit or escape key, a trackball, and other navigational or functional keys, which may be inwardly depressed to provide further input function. The UE device 202 may likewise present options for the user to select, controls for the user to actuate, and cursors or other indicators for the user to direct.

The UE device 202 may further accept data entry from the user, including numbers to dial or various parameter values for configuring the operation of the UE device 202. The UE device 202 may further execute one or more software or firmware applications in response to user commands. These applications may configure the UE device 202 to perform various customized functions in response to user interaction. Additionally, the UE device 202 may be programmed or configured over-the-air (OTA), for example from a wireless base station 210, a server 216, a wireless network access node 208, or a peer UE device 202.

Among the various applications executable by the UE device 202 are a web browser, which enables the display 204 to display a web page. The web page may be obtained via wireless communications with a wireless network access node 208, such as a cell tower, a peer UE device 202, or any other wireless communication network 212 or system. In various embodiments, the wireless network 212 is coupled to a wired network 214, such as the Internet. Via the wireless network 212 and the wired network 214, the UE device 202 has access to information on various servers, such as a server 216. The server 216 may provide content that may be shown on the display 204. Alternately, the UE device 202 may access the wireless network 212 through a peer UE device 202 acting as an intermediary, in a relay type or hop type of connection. Alternately, the UE device 202 is tethered and obtains its data from a tethered device that is connected to the wireless network 212. Skilled practitioners of the art will recognized that many such embodiments are possible and the foregoing is not intended to limit the spirit, scope, or intention of the disclosure.

Figure 3:
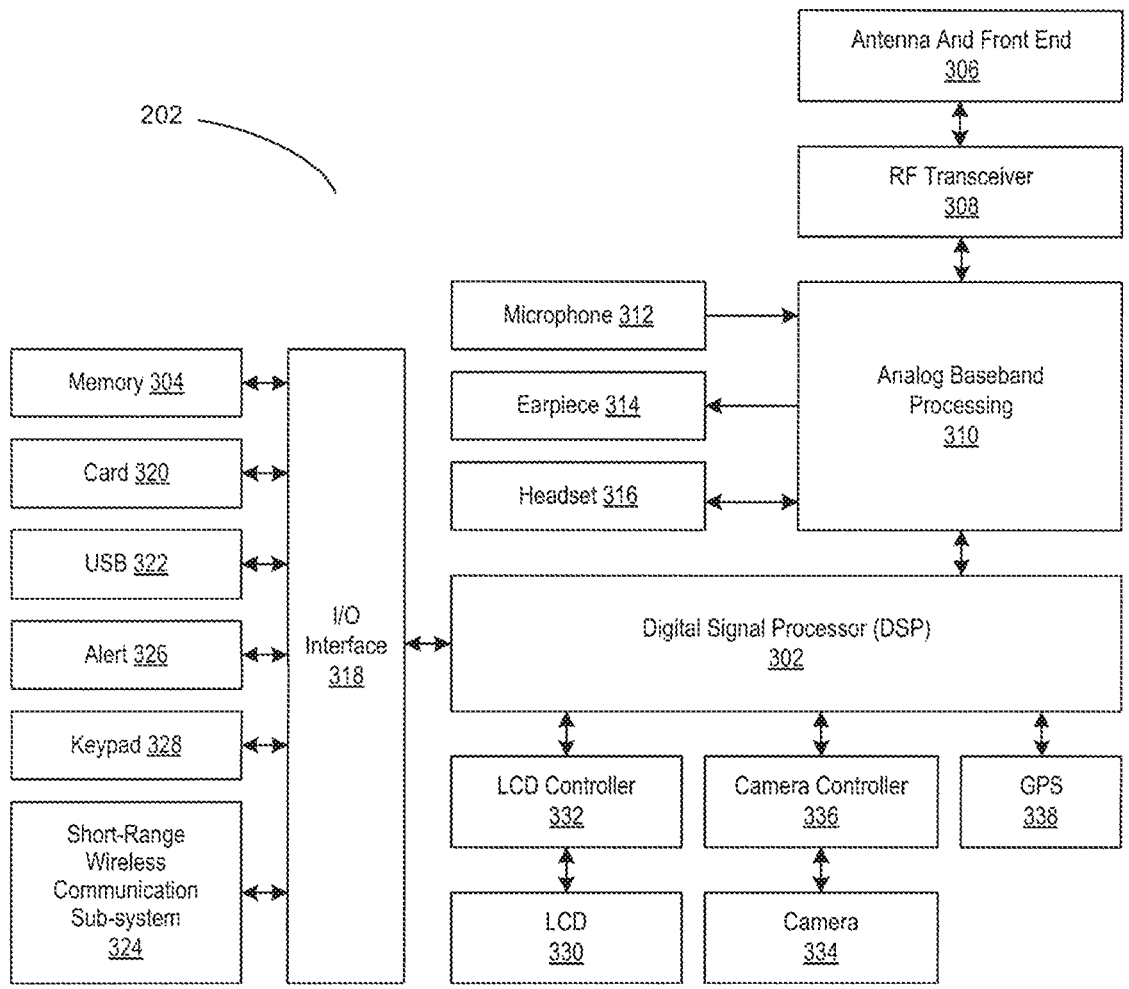
FIG. 3 is a simplified block diagram of an exemplary UE device comprising a digital signal processor (DSP)

FIG. 3 depicts a block diagram of an exemplary user equipment (UE) device 202 in which the present invention may be implemented. While various components of a UE device 202 are depicted, various embodiments of the UE device 202 may include a subset of the listed components or additional components not listed. As shown in FIG. 3, the UE device 202 includes a digital signal processor (DSP) 302 and a memory 304. As shown, the UE device 202 may further include an antenna and front end unit 306, a radio frequency (RF) transceiver 308, an analog baseband processing unit 310, a microphone 312, an earpiece speaker 314, a headset port 316, an input/output (I/O) interface 318, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338. In various embodiments, the UE device 202 may include another kind of display that does not provide a touch sensitive screen. In an embodiment, the DSP 302 may communicate directly with the memory 304 without passing through the input/output interface 318.

In various embodiments, the DSP 302 or some other form of controller or central processing unit (CPU) operates to control the various components of the UE device 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the UE device 202 to send and receive information from a cellular network or some other available wireless communications network or from a peer UE device 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the UE device 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the UE device 202 and may also enable the UE device 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the UE device 202 to communicate wirelessly with other nearby mobile devices and/or wireless base stations.

The input/output interface 318 may further connect the DSP 302 to the alert 326 that, when triggered, causes the UE device 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the UE device 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the UE device 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals, thereby enabling the UE device 202 to determine its position. Various other peripherals may also be included to provide additional functions, such as radio and television reception.

Figure 4:
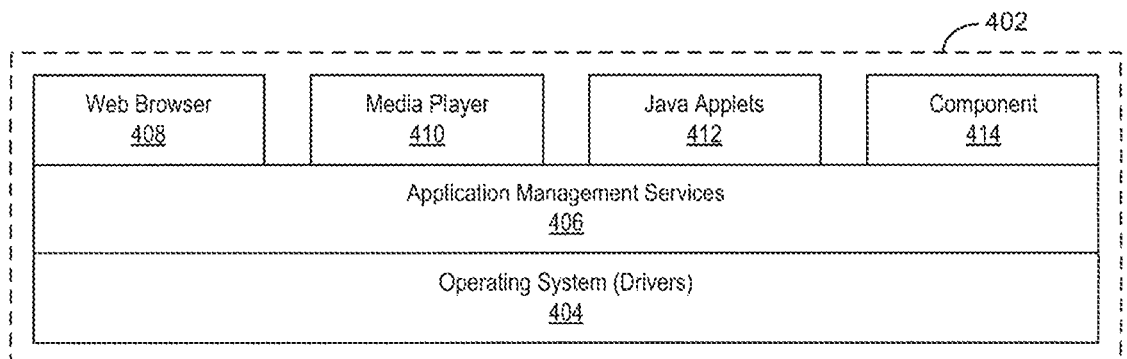
FIG. 4 is a simplified block diagram of a software environment that may be implemented by the DSP.

FIG. 4 illustrates a software environment 402 that may be implemented by the DSP 302. The DSP 302 executes operating system drivers 404 that provide a platform from which the rest of the software operates. The operating system drivers 404 provide drivers for the UE device 202 hardware with standardized interfaces that are accessible to application software. The operating system drivers 404 include application management services (AMS) 406 that transfer control between applications running on the UE device 202. Also shown in FIG. 4 are a web browser application 408, a media player application 410, and Java applets 412. The web browser application 408 configures the UE device 202 to operate as a web browser, allowing a user to enter information into forms and select links to retrieve and view web pages. The media player application 410 configures the UE device 202 to retrieve and play audio or audiovisual media. The Java applets 412 configure the UE device 202 to provide games, utilities, and other functionality. A component 414 might provide functionality described herein. The UE device 202, a base station 210, and other components described herein might include a processing component that is capable of executing instructions related to the actions described above.

Figure 5:
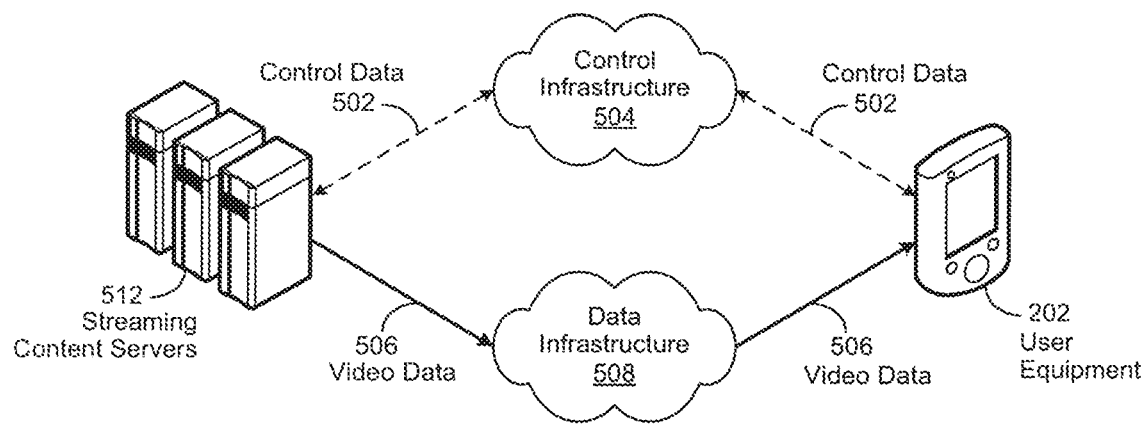
FIG. 5 is a simplified block diagram of a control infrastructure and a data infrastructure for managing the wireless delivery of streaming media content to a UE device.

FIG. 5 is a simplified block diagram of a control infrastructure and a data infrastructure as implemented in an embodiment of the invention for managing the wireless delivery of streaming media content to a user equipment (UE) device. As used herein, system efficiency is defined as the ratio of system output to system input, expressed as a percentage:

$$\text{System\_Efficiency} = (\text{System\_Output}/\text{System\_Input}) \times 100\%$$

Accordingly, network efficiency can be defined as a percentage ratio of the amount of scheduled network resources divided by the total amount of available network resources. For time division cellular technologies, network efficiency can be calculated, for example, as the ratio of the number of timeslots scheduled per user over the total number of timeslots available to the network for a given period of time. Accordingly, network efficiency for a fixed amount of available resources would be a function of either one or both of the number of users served by the network and the throughput achieved by individual users. Skilled practitioners of the art will recognize that a corresponding increase in network efficiency is realized when these parameters increase. In various embodiments, the number of users and their corresponding throughput under conditions of increasing media content demand is increased through various methods of adaptation (e.g., transcoding, etc), compression and optimization.

An alternative view of network efficiency accommodates the consideration that demand for network resources typically increases 10× to 100× with the introduction of media applications, depending upon the corresponding image quality and user demand for any given media content. Thus, network efficiency becomes more about an ability to accommodate the maximum amount of network demand associated with a media content unit of interest (e.g., movies, sessions, capacity, etc.) at a given comparative base such as cost, system performance, transmission, server performance and so on. Accordingly, the number of users would be multiples of these unit comparatives. In such cases, network efficiency does not necessary increase as the number of users served by a network increases, nor when the throughput required by individual users increases. Likewise, costs will generally increase as a result of adding more networks and more capacity. Correspondingly, network efficiency increases will generally come from minimizing the infrastructure (e.g., network, systems, etc.) required per user in a manner that also minimizes cost per user. One approach to the foregoing is to minimize solution complexity and infrastructure dependency.

Those of skill in the art will be aware that the selfish goal of a network infrastructure is to offload network traffic wherever and whenever possible. More particularly, a "buy more-carry more" model, where the data and control information must flow through the same infrastructure can only scale horizontally. Furthermore, cost efficiencies have traditionally not improved using the aforementioned horizontal scaling approach because the rate at which bandwidth and system costs drop year over year is typically slower than the rate at which the number of users increases and the rate at which they consume network infrastructure resources. One approach to these challenges is to separate the service control of streaming media content from its associated data transport.

As shown in FIG. 5, streaming media content control data 502 is exchanged between a UE device 202 and streaming media content servers 512 over a corresponding control infrastructure 504. Likewise, streaming media content, such as video data 506, is provided by the streaming media content servers 512 to the UE device 202 over a corresponding data infrastructure 508. It will be apparent to those of skill in the art that the separation of control data 502 from video data 506, and their corresponding transport over control infrastructure 504 and data infrastructure 508, provides efficient scaling of a streaming media content infrastructure. More specifically, the control data 502 overhead, which is associated with streaming media content delivery policies and contextual control, is removed from the delivery of the video data 506, resulting in more efficient delivery of the video data 506. In various embodiments, streaming media content controls for the UE device 202 are implemented within the control infrastructure 504. In these and other embodiments, the streaming media content controls may be implemented in network appliances that are geographically distributed to perform the aforementioned adaptation, compression and optimization functions.

Figure 6:
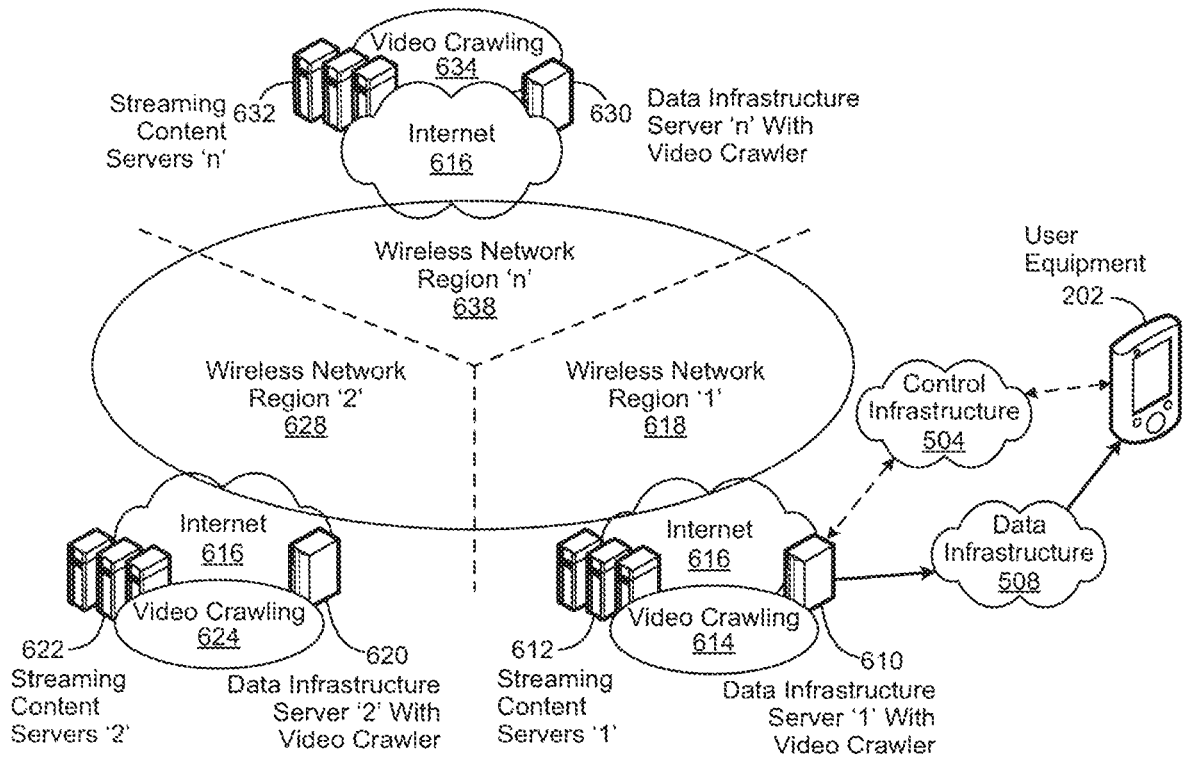
FIG. 6 shows a distributed streaming media content delivery system.

FIG. 6 shows a distributed streaming media content delivery system as implemented in accordance with an embodiment of the invention. In various embodiments, data infrastructure servers '1' 610, '2' 620, through 'n' 630 are respectively implemented with streaming media content servers '1' 612, '2' 622, through 'n' 632 in a corresponding wireless network region '1' 618, '2' 628, through 'n' 638. In these and other embodiments, a streaming media content crawler is implemented with the data infrastructure servers '1' 610, '2' 620, through 'n' 630. As implemented, the streaming media content crawlers perform corresponding streaming media content crawling operations 614, 624, 634 in conjunction with streaming media content servers '1' 612, '2' 622, through 'n' 632 on the Internet 616.

Skilled practitioners of the art will be familiar with the operation of a web crawler, which is a software agent that browses the Internet in a methodical, automated, and typically continuous, manner. A specialized version of a web crawler is a streaming media content crawler, such as a video crawler, that specializes in collecting streaming media content information, such as video content. As described in greater detail herein, data infrastructure servers '1' 610, '2' 620, through 'n' 630 are respectively implemented with a streaming media content crawler in a corresponding wireless network region '1' 618, '2' 628, through 'n' 638. The streaming content media crawlers associated with each of the data infrastructure servers '1' 610, '2' 620, through 'n' 630 perform crawling operations 614, 624, 634 to identify and download the most popular streaming media content from the Web in the respective network regions. In turn, the downloaded content is respectively stored on the data infrastructure servers '1' 610, '2' 620, through 'n' 630.

The respective popularity of streaming media content is identified for each of the wireless network regions '1' 618, '2' 628, through 'n' 638 and corresponding statistics are maintained in advance of users requesting the content. In various embodiments, the data infrastructure servers '1' 610, '2' 620, through 'n' 630 then implement a transcoder to adapt the downloaded streaming media content to the display sizes, resolutions, supported media formats, bit rates, frame rates, color depth, etc. of predetermined UE devices 202. In these and other embodiments, the transcoded streaming media content is then cached on the data infrastructure servers '1' 610, '2' 620, through 'n' 630 for subsequent downloading to predetermined UE devices 202.

In various embodiments, a user of the UE device 202 may submit a request to access a streaming content server, such as one of the streaming content servers '1' 612. In these and other embodiments, the request is intercepted by the control infrastructure 504 associated with data infrastructure server '1' 610, which in turn is associated with the wireless network region the UE device 202 is in closest proximity to. Once the request is intercepted, it is re-directed by the control infrastructure 504, which replaces the requested uniform resource locator (URL) of the streaming media content server '1' 612 with the URL address of the data infrastructure server '1' 610. The requested streaming media content, in its transcoded form, is then provided from a cache in the data infrastructure server '1' 610 via the data infrastructure 508 to the UE device 202.

In various embodiments, a user may request a particular streaming content media that has not yet been downloaded to the data infrastructure server '1' 610, transcoded, and cached. In various other embodiments, the requested streaming content media may have a popularity ranking that falls below a threshold, such as the top 100 videos for wireless network region '1' 618. In one embodiment, the data infrastructure server '1' 610 may query the corresponding streaming media content server 612 at its associated URL and replace the return address in the IP packet with that of the UE device 202. In another embodiment, the data infrastructure server '1' 610 may send an error message to the UE device 202 requesting it to directly query the corresponding streaming media content server 612 at its associated URL.

Skilled practitioners of the art will recognize that associating the data infrastructure servers '1' 610, '2' 620, through 'n' 630 with wireless network regions '1' 618, '2' 628, through 'n' 638 provides several advantages. For example, each of the data infrastructure servers '1' 610, '2' 620, through 'n' 630, with its corresponding streaming media content crawler, could be tuned to operate more effectively on the streaming media content generated in its corresponding wireless network regions '1' 618, '2' 628, through 'n' 638. As a result, bandwidth efficiencies and performance improvements may be realized since the corresponding compression efficiencies would benefit both terrestrial and cellular transmission efficiency, which would result in improved network performance and decreased transmission latency.

In various embodiments, compression and companding functions are separated from caching and optimization functions. In these and other embodiments, the Media Crawler Compression/Companding function ("MCCC") is provided a list of streaming media content servers (e.g., '1' 612, '2' 622, through 'n' 632) located in its corresponding wireless network region (e.g., '1' 618, '2' 628, through 'n' 638).

The streaming media content servers (e.g., '1' 612, '2' 622, through 'n' 632) are then accessed and a Content Media Essence ("CME") file is generated. Once generated, the CME file is then provided to the data infrastructure servers (e.g., '1' 610, '2' 620, through 'n' 630) that are situated closest to users most interested in the identified streaming media content. Additional optimization is then performed on the identified streaming media content according to UE device 202 types that are associated with predetermined wireless network providers, geographic locales, and user populations. Accordingly, streaming media content caching and device optimization is performed closest to the users with the greatest interest in the identified streaming media content. As a result, the user's wireless network latencies are further reduced, which increases the overall user experience.

Figure 7:
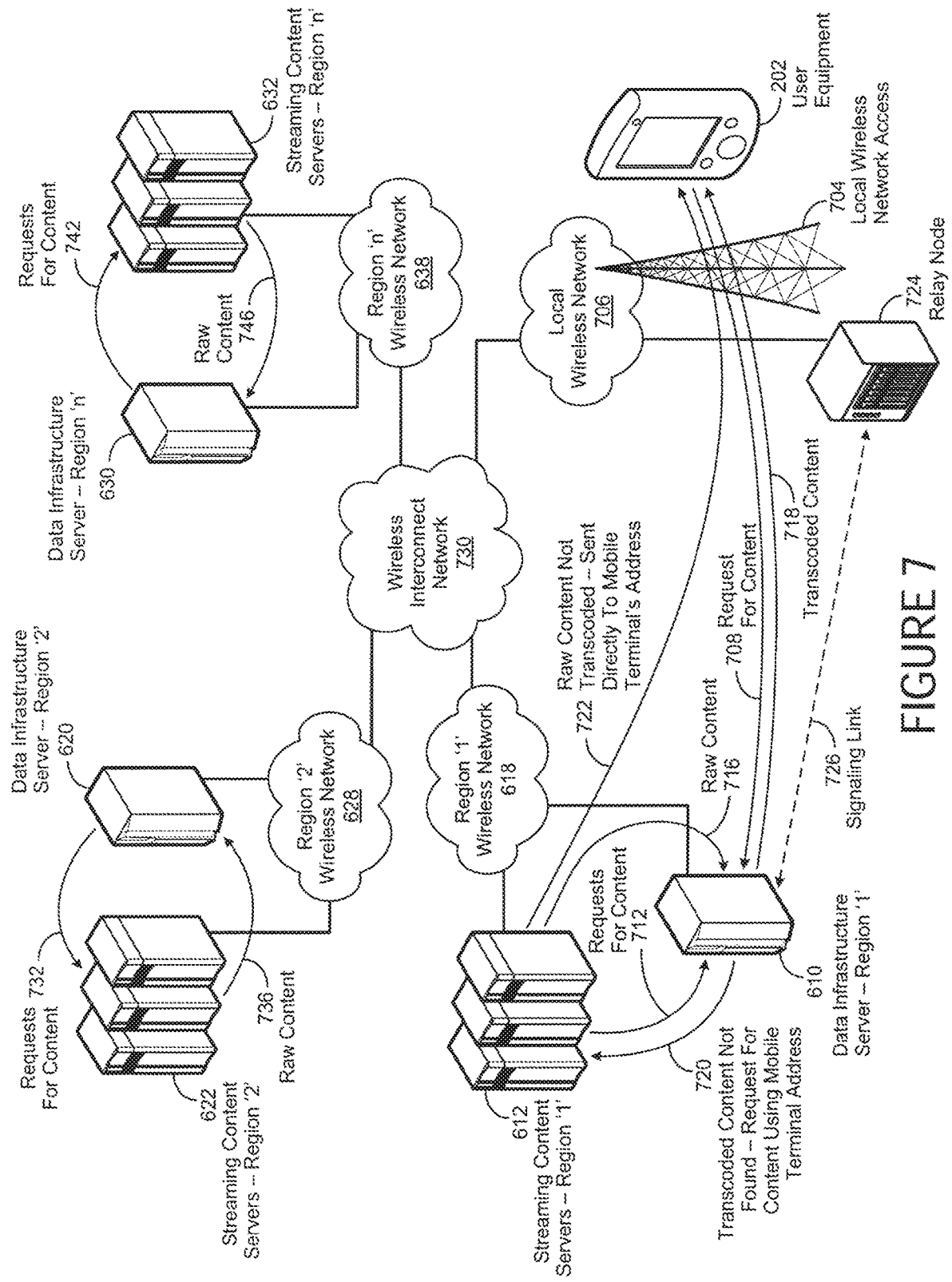
FIG. 7 shows a distributed streaming media content delivery system as implemented with a relay node.

FIG. 7 shows a distributed streaming media content delivery system as implemented with a relay node in accordance with an embodiment of the invention. In various embodiments, data infrastructure servers '1' 610, '2' 620, through 'n' 630 are respectively implemented with streaming media content servers '1' 612, '2' 622, through 'n' 632 in a corresponding wireless network region '1' 618, '2' 628, through 'n' 638. In these and other embodiments, the wireless network regions '1' 618, '2' 628, through 'n' 638 are interconnected, along with local wireless network 706, through a wireless interconnect network 730. Likewise, as described in greater detail herein, the data infrastructure servers '1' 610, '2' 620, through 'n' 630 respectively place requests 712, 732, 742 for raw streaming media content from the streaming media content servers '1' 612, '2' 622, through 'n' 632. As likewise described in greater detail herein, once the raw streaming content is received 716, 736, 746, it is transcoded by the data infrastructure servers '1' 610, '2' 620, through 'n' 630 for subsequent provision to a user equipment (UE) device 202.

In various embodiments, the UE device 202 initiates a radio access signaling sequence through a local wireless access 704 point, such as a cell tower with a base station, to connect to the local wireless network 706. Once the connection is established, the UE device 202 requests packet data and Internet Protocol (IP) address information from the region '1' wireless network 618. Thereafter, the region '1' wireless network 618 returns the requested packet data and IP address information to the UE device 202.

The UE device 202 then sends its corresponding screen size, supported media formats, and IP address or other identifier information to the data infrastructure server '1' 610. In one embodiment, once the information is sent, the UE device 202 then requests 708 predetermined streaming media content from the data infrastructure server '1' 610. If the data infrastructure server '1' 610 determines that the requested streaming media content is stored in transcoded form on the data infrastructure server '1' 610 it returns 718 the requested streaming media content, in transcoded form to the UE device 202.

In another embodiment, the UE device 202 requests 718 predetermined streaming media content from the data infrastructure server '1' 610 and it is determined that the requested streaming content media is not stored on the data infrastructure server '1' 610. In this embodiment, the data infrastructure server '1' 610 then uses the return address of the UE device 202 to send a request 720 to the streaming content server 612 for the requested streaming content media. Thereafter, the streaming media content server '1' 612 returns 722 the requested streaming media content to the UE device 202.

In yet another embodiment, the UE device 202 sends its corresponding screen size, supported media formats, and IP address or other identifier information to a relay node 724. In turn, the relay node 724 sends the UE device's 202 corresponding screen size, supported media formats, and IP address or other identifier information, along with any other required parameters via signal link 726 to the data infrastructure server '1' 610. Thereafter, the relay node 724 likewise sends the URL or other identifier information associated with the data infrastructure server '1' 610 to the UE device 202.

Once the information is sent, the UE device 202 then requests 708 streaming media content from the data infrastructure server '1' 610 and receives 718 the requested streaming media content, in transcoded form, as previously described. Likewise, as also previously described, if the requested streaming content media is not stored on the data infrastructure server '1' 610, then the data infrastructure server '1' 610 uses the return address of the UE device 202 to send a request 720 to the streaming content server 612 for the requested streaming content media. Thereafter, the streaming media content server '1' 612 returns 722 the requested streaming media content to the UE device 202.

Figure 8:
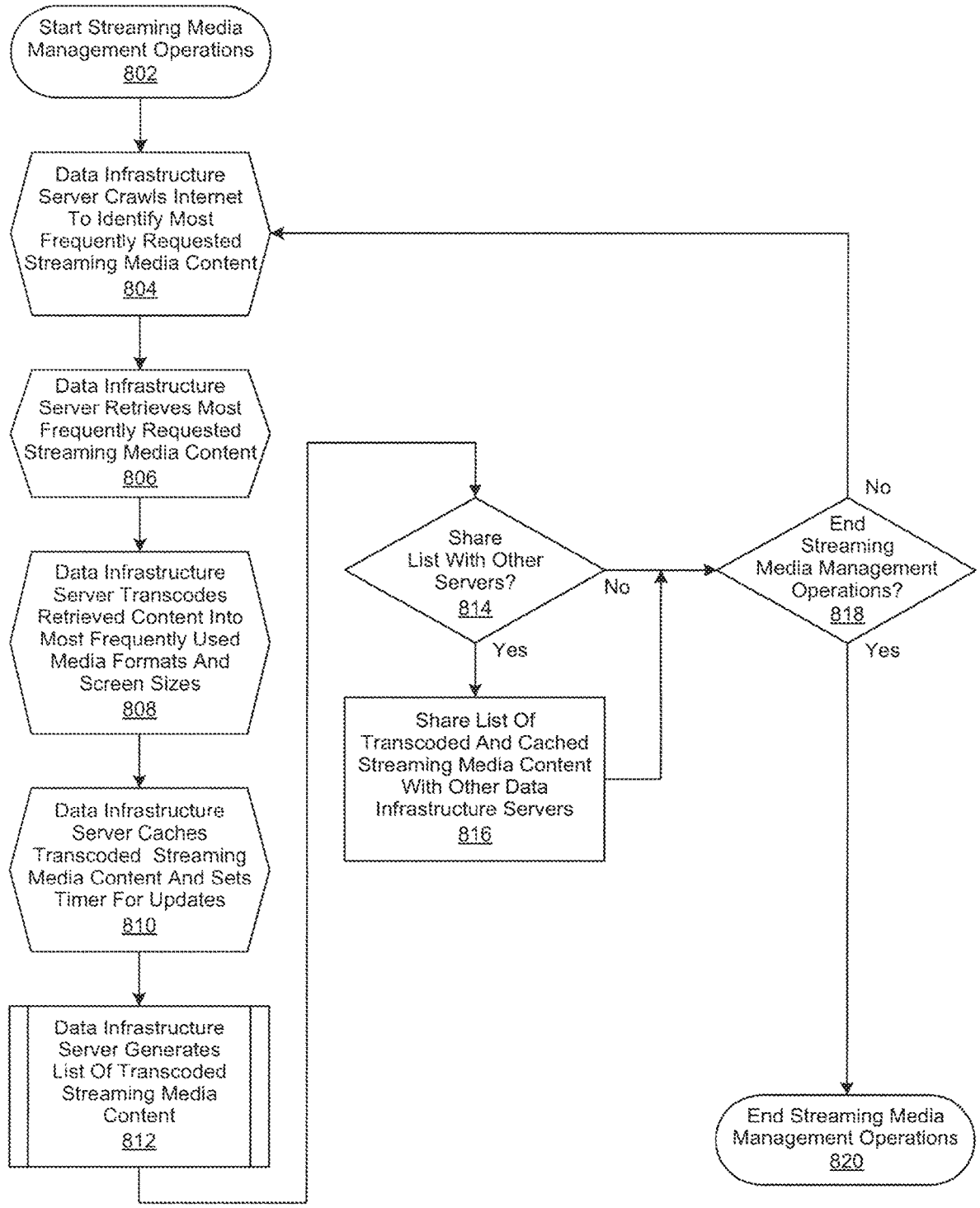
FIG. 8 is a flow chart showing the operation of a data infrastructure server for the management of streaming media content.

FIG. 8 is a flow chart showing the operation of a data infrastructure server for the management of streaming media content. In this embodiment, streaming media content management operations are begun in step 802, followed by a streaming media content crawler implemented on a data infrastructure periodically crawling the Internet in step 804 to identify the most frequently requested streaming media content. In step 806, the most frequently requested streaming media content is retrieved by the data infrastructure, followed by being transcoded by the data infrastructure in step 808 into the most frequently used media formats and screen sizes. Then, in step 810, the data infrastructure server caches the transcoded streaming media content and sets a timer for updates. In one embodiment, the timer determines the frequency that the data infrastructure updates the transcoded streaming media content from its source location. In another embodiment, the updating comprises determining whether the transcoded streaming media content is still requested on a frequent basis. In yet another embodiment, the request frequency defining whether or not the transcoded streaming media content is popular is determined by the implementation of a predetermined request frequency threshold.

The data infrastructure server then generates a list of the transcoded streaming media content in step 812, followed by a determination being made in step 814 whether to share the list with data infrastructure servers associated with corresponding wireless network regions as explained in greater detail herein. If so, then the list is shared with other predetermined data infrastructure servers in step 816. Otherwise, or after the list has been shared in step 816, a determination is made in step 818 whether to end streaming media content management operations. If not, then the process is continued, proceeding with step 804. Otherwise, streaming content media management operations are ended in step 820.

Figure 9A:
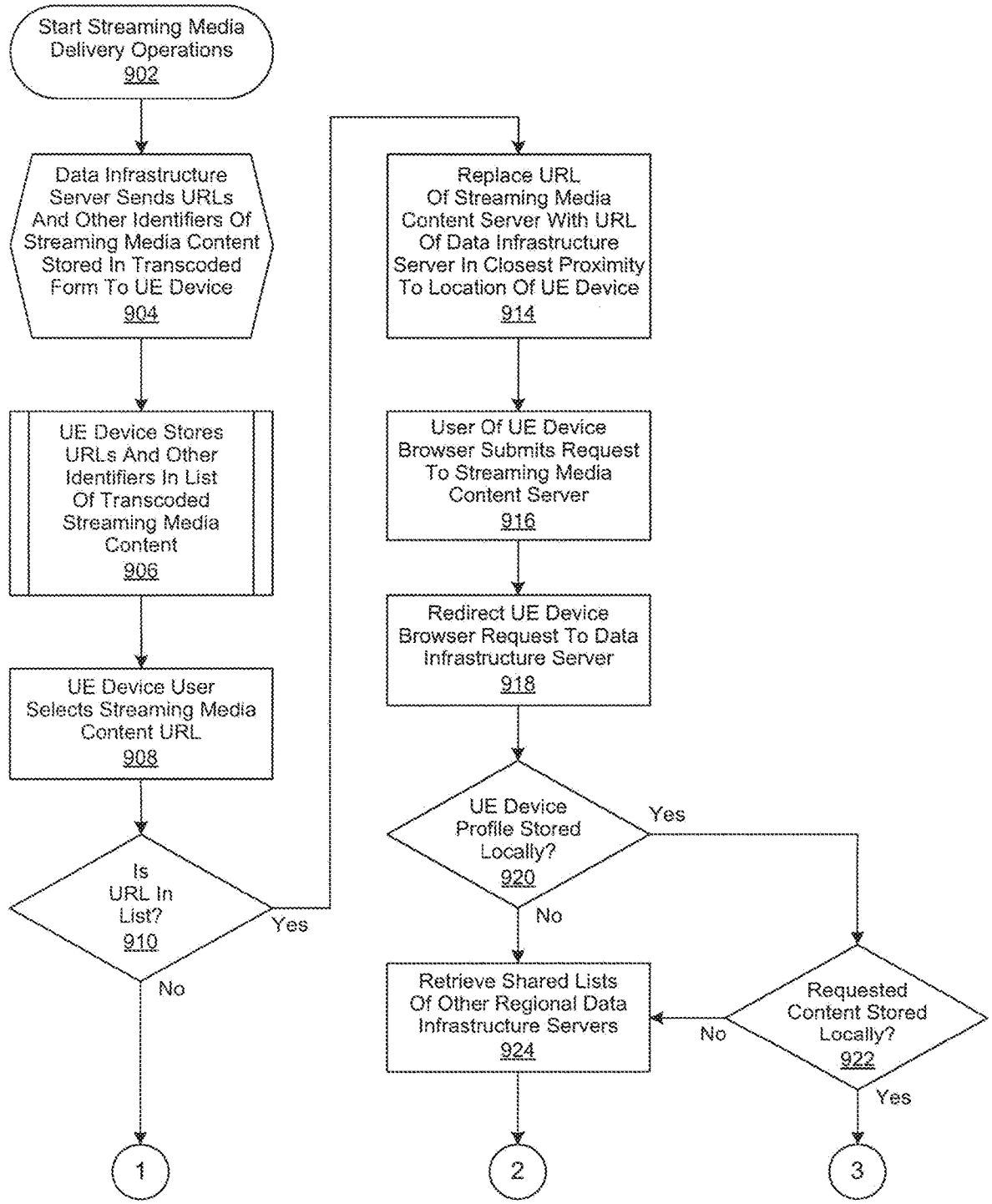
FIGS. 9A and 9B depict aspects of a flow chart showing the operation of a data infrastructure server for the delivery of streaming media content.
Figure 9B:
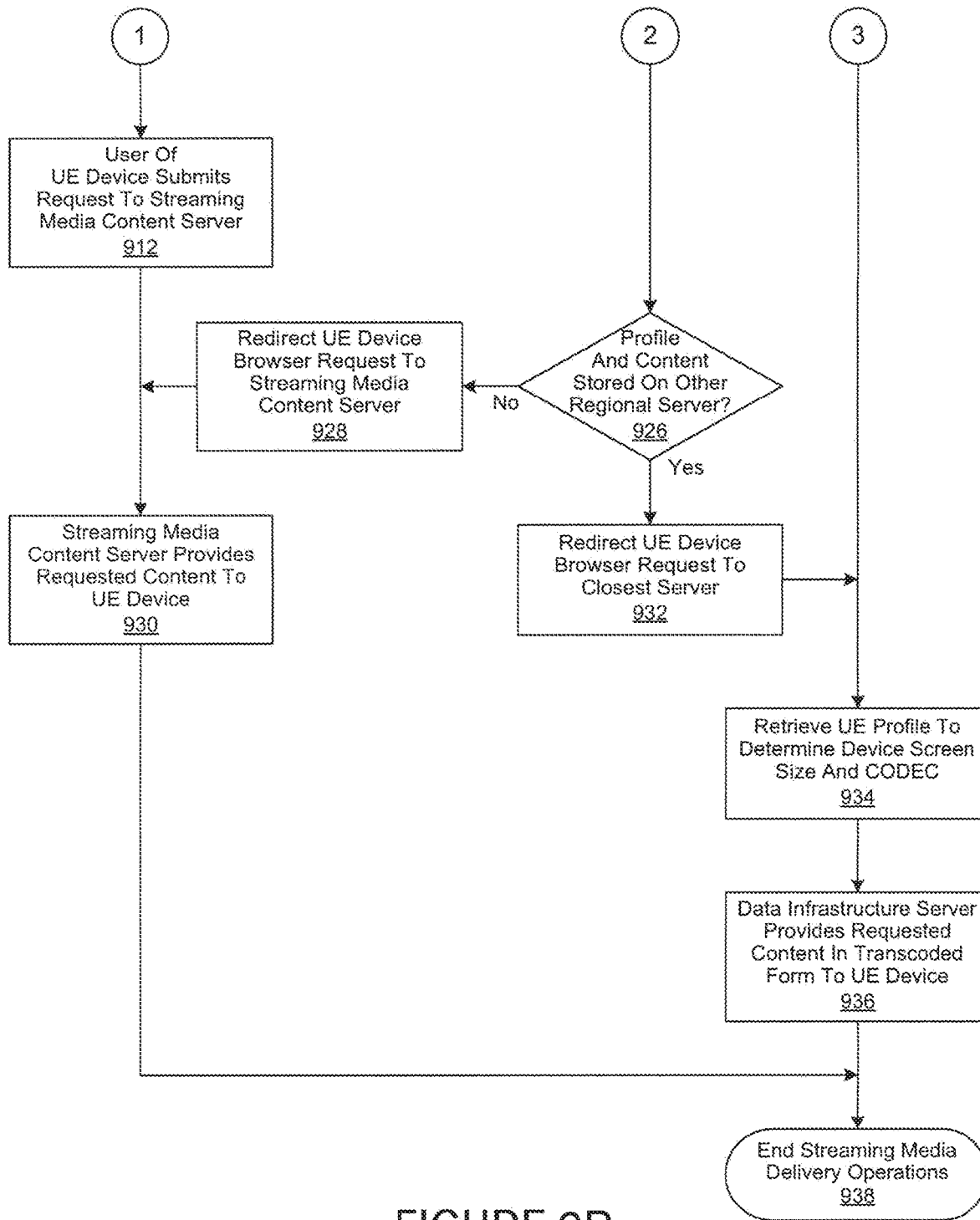

FIGS. 9A and 9B depict aspects of a flow chart showing the operation of a data infrastructure server for the delivery of streaming media content. In this embodiment, streaming media content delivery operations are begun in step 902, followed by a data infrastructure server sending uniform resource locator (URL) and other identifiers of streaming media content stored in transcoded form to a predetermined user equipment (UE) device in step 904. Then, in step 906, the UE device then receives and stores the URL and other identifiers in a list of transcoded streaming media content.

The user of the UE device then selects a URL in step 908 to receive predetermined streaming media content, followed by a determination being made in step 910 whether the selected URL is currently listed within the list of transcoded streaming media content. If not, then the user of the UE device submits a request for predetermined streaming media content to the corresponding streaming media content server in step 912. Otherwise, the URL of the streaming media content server is replaced in step 914 with the URL of a target data infrastructure server that is in closest proximity to the physical location of the UE device. The user of the UE device then submits a request in step 916 to the streaming media server associated with the selected streaming content media. The UE device browser request is then redirected in step 918 from the URL of the streaming content media server to the URL of the target data infrastructure server.

Then, a determination is made in step 920 whether a UE device profile, comprising the UE's screen size, supported media formats (e.g., an installed CODEC), and other information, is stored on the target data infrastructure server. If so, then a determination is made in step 922 whether the requested streaming content media is likewise currently stored on the target data infrastructure server. If not, or if is determined in step 920 that the UE device profile is not stored on the target data infrastructure server, then the shared lists of other regional data infrastructure servers is retrieved in step 924.

A determination is then made in step 926 whether the desired UE device profile and the requested transcoded streaming media content exist on another data infrastructure server. If so, the UE device browser is redirected in step 932 to the closest data infrastructure server. Thereafter, or if it was determined in step 926 that the requested streaming media content is stored locally on the target data infrastructure server, then the UE device profile is retrieved in step 934 to determine the UE device's screen size, supported media formats, and other related information. The UE device profile information is then used in step 936 to provide the requested streaming media content to the UE device in the appropriate transcoded form. Streaming media content delivery operations are then ended in step 938.

However, if it was determined in step 926 that the UE device profile and requested transcoded streaming media content does not exist on another data infrastructure server, then the UE device browser is redirected in step 928 to the URL of the streaming media content server corresponding to the requested streaming media content. Thereafter, or after the user of the UE device submits a request for predetermined streaming media content to the corresponding streaming media content server in step 912, the streaming media content server provides the requested streaming media content to the UE device in step 930. Streaming media content delivery operations are then ended in step 938.

Figure 10:
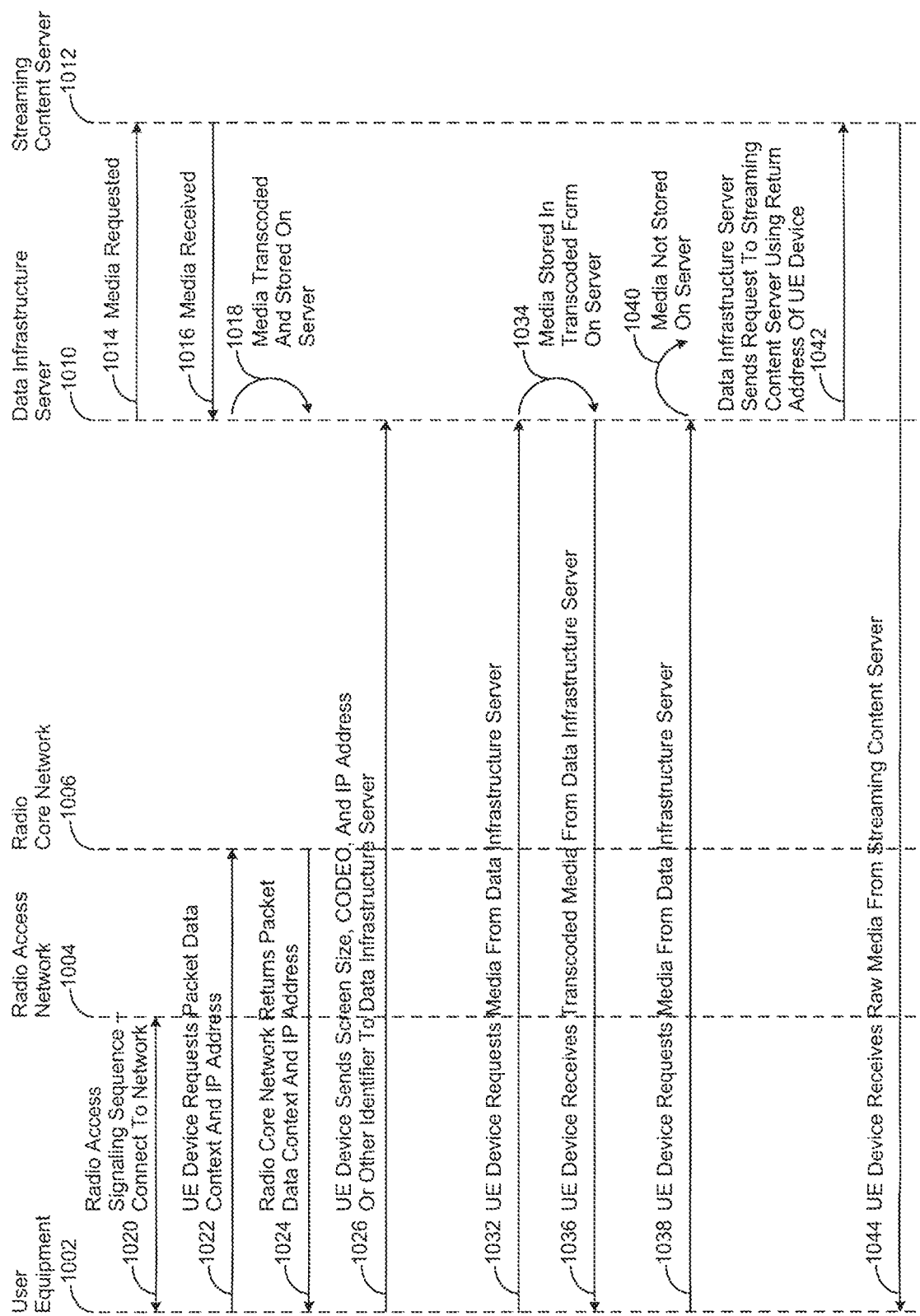
FIG. 10 is a process flow diagram of the operation of a data infrastructure server for the delivery of streaming media content.

FIG. 10 is a process flow diagram of the operation of a data infrastructure server as implemented in accordance with an embodiment of the invention for the delivery of streaming media content. In this embodiment, a data infrastructure server 1010 requests 1014 streaming media content from a streaming content server 1012 as described in greater detail herein. In response, the streaming content server 1012 returns the requested streaming media content, where it is received 1016 by the data infrastructure server 1010. Once received, the streaming media content is transcoded and stored 1018 on the data infrastructure server 810 as likewise described in greater detail herein.

Thereafter, a user equipment (UE) device 1002 initiates a radio access signaling sequence 1020 to connect to a radio access network 1004. Once the connection to the radio access network 1004 is established, the UE device 1002 requests 1022 packet data and Internet Protocol (IP) address information from radio core network 1006. Thereafter, the radio core network 1006 returns 1024 the requested packet data and IP address information to the UE device 1002.

The UE device 1002 then sends 1026 its corresponding screen size, supported media formats, and IP address or other identifier information to the data infrastructure server 1010. In one embodiment, once the information is sent, the UE device 1002 then requests 1032 predetermined streaming media content from the data infrastructure server 1010. The data infrastructure server 1010 then determines 1034 that the requested streaming media content is stored in transcoded form on the data infrastructure server 1010. In response, the data infrastructure server 1010 returns the requested streaming media content, in transcoded form, where it is received 1036 by the UE device 1002.

In another embodiment, the UE device 1002 requests 1038 predetermined streaming media content from the data infrastructure server 1010 and it is determined 1040 that the requested streaming content media is not stored on the data infrastructure server 1010. In this embodiment, the data infrastructure server then uses the return address of the UE device 1002 to send a request 1042 to the corresponding streaming media content server 1012 for the requested streaming content media. Thereafter, the streaming media content server 1012 returns 1044 the requested streaming media content to the UE device 1002.

Figure 11:
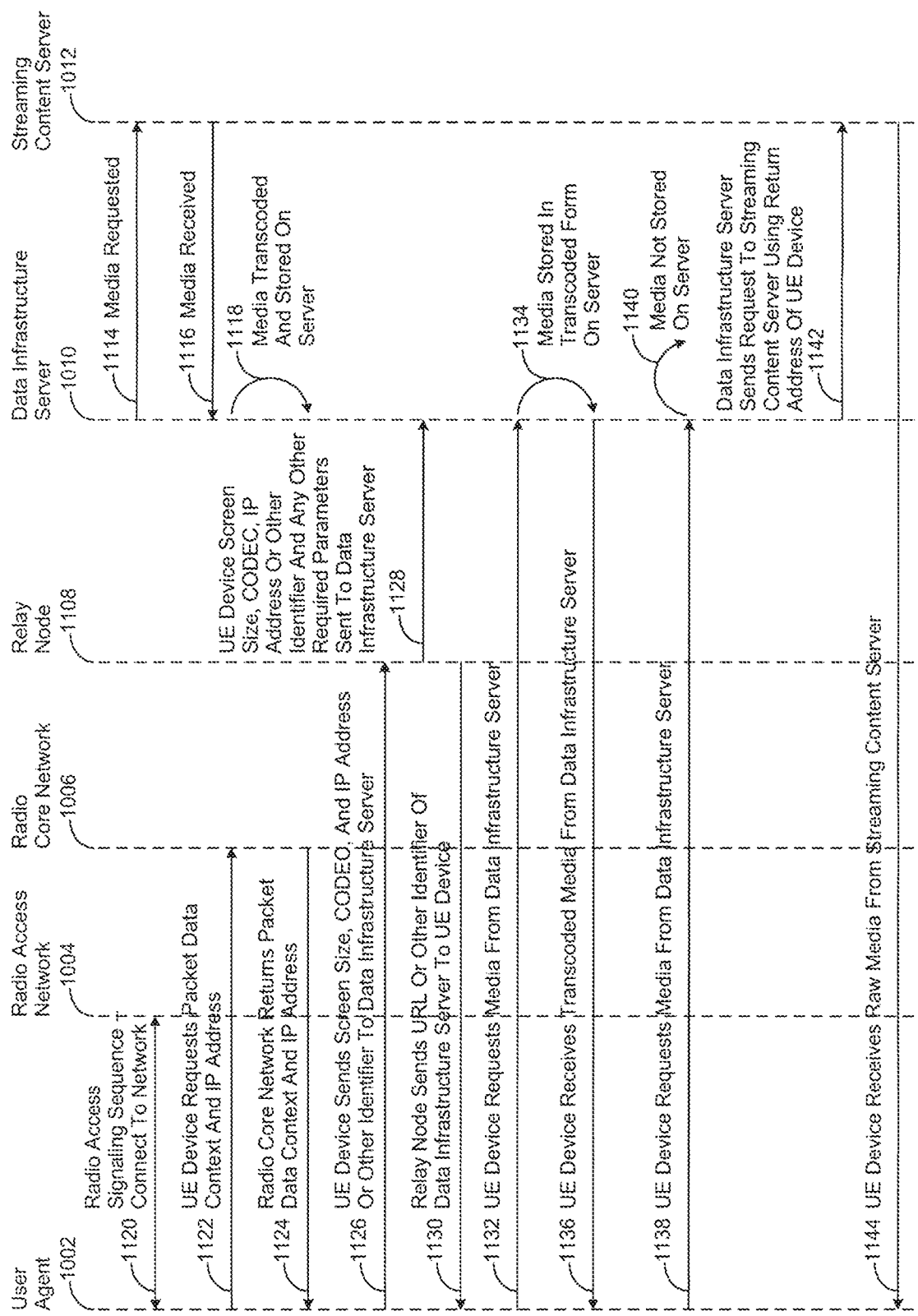
FIG. 11 is a process flow diagram of the operation of a data infrastructure server as implemented with a relay node for the delivery of streaming media content.

FIG. 11 is a process flow diagram of the operation of a data infrastructure server as implemented with a relay node in accordance with an embodiment of the invention for the delivery of streaming media content. In this embodiment, a data infrastructure server 1010 requests 1114 streaming media content from a streaming content server 1012 as described in greater detail herein. In response, the streaming content server 1012 returns the requested streaming media content, where it is received 1116 by the data infrastructure server 1010. Once received, the streaming media content is transcoded and stored 1118 on the data infrastructure server 1010 as likewise described in greater detail herein.

Thereafter, a user equipment (UE) device 1002 initiates a radio access signaling sequence 1120 to connect to a radio access network 1004. Once the connection to the radio access network 1004 is established, the UE device 1002 requests 1122 packet data and Internet Protocol (IP) address information from radio core network 1006. Thereafter, the radio core network 1006 returns 1124 the requested packet data and IP address information to the UE device 1002.

The UE device 1002 then sends 1126 its corresponding screen size, supported media formats, and IP address or other identifier information to a relay node 1108. In turn, the relay node 1108 sends 1128 the UE device's 1002 corresponding screen size, supported media formats, and IP address or other identifier information, along with any other required parameters, to the data infrastructure server 1010. Thereafter, the relay node 1108 sends 1130 the URL or other identifier information associated with the data infrastructure server 1010 to the UE device 1002.

In one embodiment, once the information is sent, the UE device 1002 then requests 1132 predetermined streaming media content from the data infrastructure server 1010. The data infrastructure server 1010 then determines 1134 that the requested streaming media content is stored in transcoded form on the data infrastructure server 810. In response, the data infrastructure server 1010 returns the requested streaming media content, in transcoded form, where it is received 1036 by the UE device 1002.

In another embodiment, the UE device 1002 requests 1038 predetermined streaming media content from the data infrastructure server 1010 and it is determined 1140 that the requested streaming content media is not stored on the data infrastructure server 1010. In this embodiment, the data infrastructure server then uses the return address of the UE device 1002 to send a request 1142 to the corresponding streaming content server 1012 for the requested streaming content media. Thereafter, the streaming media content server 1012 returns 1144 the requested streaming media content to the UE device 1002.

A system and method are disclosed for managing the wireless delivery of streaming media content to a user equipment (UE) device. In various embodiments, a plurality of data infrastructure servers are respectively implemented with streaming media content servers in corresponding wireless network regions. In these and other embodiments, the data infrastructure servers respectively place requests for raw streaming media content from their corresponding streaming media content servers. Once the raw streaming content is received, it is transcoded by the data infrastructure servers and stored in a cache for subsequent distribution to a UE device.

In various embodiments, the UE device establishes a network connection with a local wireless network, which in turn is associated with a wireless network region with a corresponding data infrastructure server. Once the connection is established, the UE device sends device- or service-specific information including the UE device screen size, supported media formats, IP address or other identifier information, policies, rules, and contextual information to the target data infrastructure server. In one embodiment, once the information is sent, the UE device then requests predetermined streaming media content from the data infrastructure server. A determination is made whether the requested streaming media content is stored in transcoded form on the data infrastructure server. If so, then a control information network is implemented to transmit and receive streaming media content control data between the UE device and the data infrastructure server. In turn, the streaming media content control data is used by the data infrastructure server to control the transmission of the transcoded streaming media content over a data network for delivery to the UE device.

In another embodiment, the UE device requests predetermined streaming media content from the data infrastructure server and it is determined that the requested streaming content media is not stored on the data infrastructure server. In this embodiment, the data infrastructure server uses the return address of the UE device to send a request to the streaming content server for the requested streaming content media, which is then provided by the streaming media content server to the UE device.

In yet another embodiment, the UE device sends its device- or service-specific information, including its device screen size, supported media formats, and IP address or other identifier information to a relay node. In turn, the relay node retransmits the information, along with any other required parameters, to the data infrastructure server and the transcoded streaming media content is then transmitted to the UE device, either by the data infrastructure server or the streaming media content server.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made.

What is claimed is:

1. A data infrastructure server, comprising:
   a memory;
   a cache configured to store a plurality of transcoded streaming media content, each corresponding to a particular user equipment device configuration; and
   a processor coupled to the memory and the cache and configured to execute instructions stored in the memory to:
   receive a request for streaming media content from a user equipment;
   receive user equipment device configuration data;
   process the user equipment device configuration data to select from the cache a transcoded streaming media content that corresponds to the requested streaming media content transcoded to be operable with the user equipment when the requested streaming media content is stored as one of the plurality of transcoded streaming media content in the cache;
   transmit the transcoded streaming media content corresponding to the requested streaming media content to the user equipment according to the user equipment device configuration data when the requested streaming media content is stored as the transcoded streaming media content in the cache and a profile associated with the user equipment is stored on the data infrastructure server; and
   redirect the request for streaming media content to a second server when the requested streaming media content is not stored as the transcoded streaming media content in the cache and the profile associated with the user equipment is not stored on the data infrastructure server.

2. The data infrastructure server of claim 1, wherein the processor is further configured to:
   obtain selected streaming media content from a streaming media content server based on a determination that the selected streaming media content has been requested for downloading more frequently than other streaming media content;
   transcode the selected streaming media content received from the streaming media content server into the transcoded streaming media content; and
   store the transcoded streaming media content in the cache.

3. The data infrastructure server of claim 1, wherein the second server is a second data infrastructure server, wherein the second data infrastructure server is geographically located proximate to the data infrastructure server, and wherein the processor is further configured to redirect the request for streaming media content to the second data infrastructure server when the requested streaming media content is not stored as the transcoded streaming media content in the cache, the requested streaming media content is stored on the second data infrastructure server, and the profile associated with the user equipment is stored on the second data infrastructure server.

4. The data infrastructure server of claim 1, wherein the second server is a streaming media content server, and wherein the processor is further configured to redirect the request for streaming media content to the streaming media content server when the requested streaming media content is not stored as the transcoded streaming media content in the cache and the requested streaming media content or the profile associated with the user equipment is not stored on a second data infrastructure server geographically located proximate to the data infrastructure server.

5. The data infrastructure server of claim 4, wherein redirecting the request for streaming media content to the streaming media content server causes the streaming media content server to transmit the requested streaming media content directly to the user equipment without the data infrastructure server first receiving the requested streaming media content.

6. The data infrastructure server of claim 1, wherein the processor is further configured to perform crawling operations on a network comprising a plurality of streaming media content servers to collect streaming media content usage data.

7. The data infrastructure server of claim 6, wherein the processor is further configured to:
process the streaming media content usage data to generate a corresponding streaming media content popularity rating for individual streaming media content; and
generate a list of the most popular streaming media content according to the streaming media content popularity rating.

8. A computer-implemented method for delivery of streaming media content to a user equipment, comprising:
receiving, by a data infrastructure server, a request for streaming media content from a user equipment;
receiving user equipment device configuration data;
processing the user equipment device configuration data to select a transcoded streaming media content that corresponds to the requested streaming media content transcoded to be operable with the user equipment when the requested streaming media content is stored as one of the plurality of transcoded streaming media content on the data infrastructure server;
transmitting the transcoded streaming media content corresponding to the requested streaming media content to the user equipment according to the user equipment device configuration data when the requested streaming media content is stored as transcoded streaming media content on the data infrastructure server and a profile associated with the user equipment is stored on the data infrastructure server; and
redirecting the request for streaming media content to a second server when the requested streaming media content is not stored as the transcoded streaming media content on the data infrastructure server and the profile associated with the user equipment is not stored on the data infrastructure server.

9. The computer-implemented method of claim 8, further comprising:
obtaining selected streaming media content from a streaming media content server based on a determination that the selected streaming media content has been requested for downloading more frequently than other streaming media content;
transcoding the selected streaming media content received from the streaming media content server into transcoded streaming media content; and
storing the transcoded streaming media content in the cache.

10. The computer-implemented method of claim 8, wherein the second server is a second data infrastructure server, wherein the second data infrastructure server is geographically located proximate to the data infrastructure server, and wherein the computer-implemented method further comprises redirecting the request for streaming media content to the second data infrastructure server when the requested streaming media content is not stored as the transcoded streaming media content in the cache, the requested streaming media content is stored on the second data infrastructure server, and the profile associated with the user equipment is stored on the second data infrastructure server.

11. The computer-implemented method of claim 8, wherein the second server is a streaming media content server, and wherein the computer-implemented method further comprises redirecting the request for streaming media content to the streaming media content server when the requested streaming media content is not stored as the transcoded streaming media content in the cache and the requested streaming media content or the profile associated with the user equipment is not stored on a second data infrastructure server geographically located proximate to the data infrastructure server.

12. The computer-implemented method of claim 11, wherein redirecting the request for streaming media content to the streaming media content server causes the streaming media content server to transmit the requested streaming media content directly to the user equipment without the data infrastructure server first receiving the requested streaming media content.

13. The computer-implemented method of claim 8, further comprising crawling a network comprising a plurality of streaming media content servers to collect streaming media content usage data.

14. The computer-implemented method of claim 13, further comprising:
processing the streaming media content usage data to generate a corresponding streaming media content popularity rating for individual streaming media content; and
generating a list of the most popular streaming media content according to the streaming media content popularity rating.

15. A streaming media content server comprising:
a memory; and
a processor coupled to the memory and configured to execute instructions stored in the memory to:
receive a redirected request for streaming media content from a data infrastructure server when the streaming media content is not stored in a cache of the data infrastructure server and a profile associated with the user equipment is not stored on the data infrastructure server;
receive user equipment device configuration data for a user equipment;
process the user equipment device configuration data to select a transcoded streaming media content that corresponds to the requested streaming media content transcoded to be operable with the user equipment when the requested streaming media content is stored as one of the plurality of transcoded streaming media content in the streaming media content server; and transmit, in response to receipt of the redirected request for streaming media content when the streaming media content and the profile associated with the user equipment is not stored on the data infrastructure server, the transcoded streaming media content corresponding to the requested streaming media content when the requested streaming media content is stored as the transcoded streaming media content on the streaming media content server and a profile associated with the user equipment is stored on the streaming media content server.

16. The streaming media content server of claim 15, wherein the processor further:

receives a request for frequently requested streaming media content from the data infrastructure server, wherein the frequently requested streaming media content is streaming media content requested from the data infrastructure server for downloading more frequently than other streaming media content; and transmits, in response to receipt of the request for frequently requested streaming media content, the frequently requested streaming media content to the data infrastructure server.

17. The streaming media content server of claim 15, wherein the requested streaming media content server has not been previously transmitted to the data infrastructure server as the frequently requested streaming media content.

18. The streaming media content server of claim 15, wherein the streaming media content server transmits the requested streaming media content to the user equipment directly without first transmitting the requested streaming media content to the data infrastructure server.

* * * * *